(12) United States Patent
Das Purkayastha (10) Patent No.: US 9,183,128 B2
(45) Date of Patent: Nov. 10, 2015

(54) DEVICE CONTROLLER FOR A MEMORY DEVICE

(75) Inventor: Saugata Das Purkayastha, Bangalore (IN)

(73) Assignee: ST-Ericsson SA, Plan-les-Ouates (CH)

( * ) Notice: Subject to any disclaimer, the term of this patent is extended or adjusted under 35 U.S.C. 154(b) by 104 days.

(21) Appl. No.: 13/977,623

(22) PCT Filed: Feb. 23, 2012

(86) PCT No.: PCT/EP2012/053080
§ 371 (c)(1),
(2), (4) Date: Sep. 26, 2013

(87) PCT Pub. No.: WO2012/113872
PCT Pub. Date: Aug. 30, 2012

(65) Prior Publication Data
US 2014/0025906 A1    Jan. 23, 2014

(30) Foreign Application Priority Data

Feb. 23, 2011    (IN) .............................. 502/DEL/2011

(51) Int. Cl.
*G06F 5/00*    (2006.01)
*G06F 12/02*    (2006.01)

(52) U.S. Cl.
CPC .......... *G06F 12/023* (2013.01); *G06F 12/0246* (2013.01); *G06F 2212/7207* (2013.01)

(58) Field of Classification Search
CPC ..... H04L 69/08; H04L 29/06; G06F 12/0246; G06F 2212/7207
USPC .............................................. 709/248; 710/61
See application file for complete search history.

(56) References Cited

U.S. PATENT DOCUMENTS

| | | |
|---|---|---|
| 2005/0021764 A1 | 1/2005 | Barrall et al. |
| 2008/0077742 A1 | 3/2008 | Ashton et al. |
| 2010/0023682 A1 | 1/2010 | Lee et al. |
| 2010/0250833 A1 | 9/2010 | Trika |

*Primary Examiner* — Ernest Unelus
(74) *Attorney, Agent, or Firm* — Coats & Bennett, PLLC (57) ABSTRACT

The invention provides a method for controlling writing of data to a data storage card having a device controller and a storage medium. Particularly, the device controller receives a meta data synchronization disable command and in response, enters a first mode. In the first mode, the device controller does not synchronize meta data related to a data write request to write the data to the storage medium, leaving corresponding unsynchronized meta data. The device controller receives a data write request to write the data, and in response, effects the data write request such that the data is written to the storage medium. However, the meta data related to the data write request is not synchronized to the storage medium. Other aspects provide a corresponding device controller and software/firmware.

20 Claims, 6 Drawing Sheets

DEVICE CONTROLLER FOR A MEMORY DEVICE

BACKGROUND OF THE INVENTION

Figure 1:
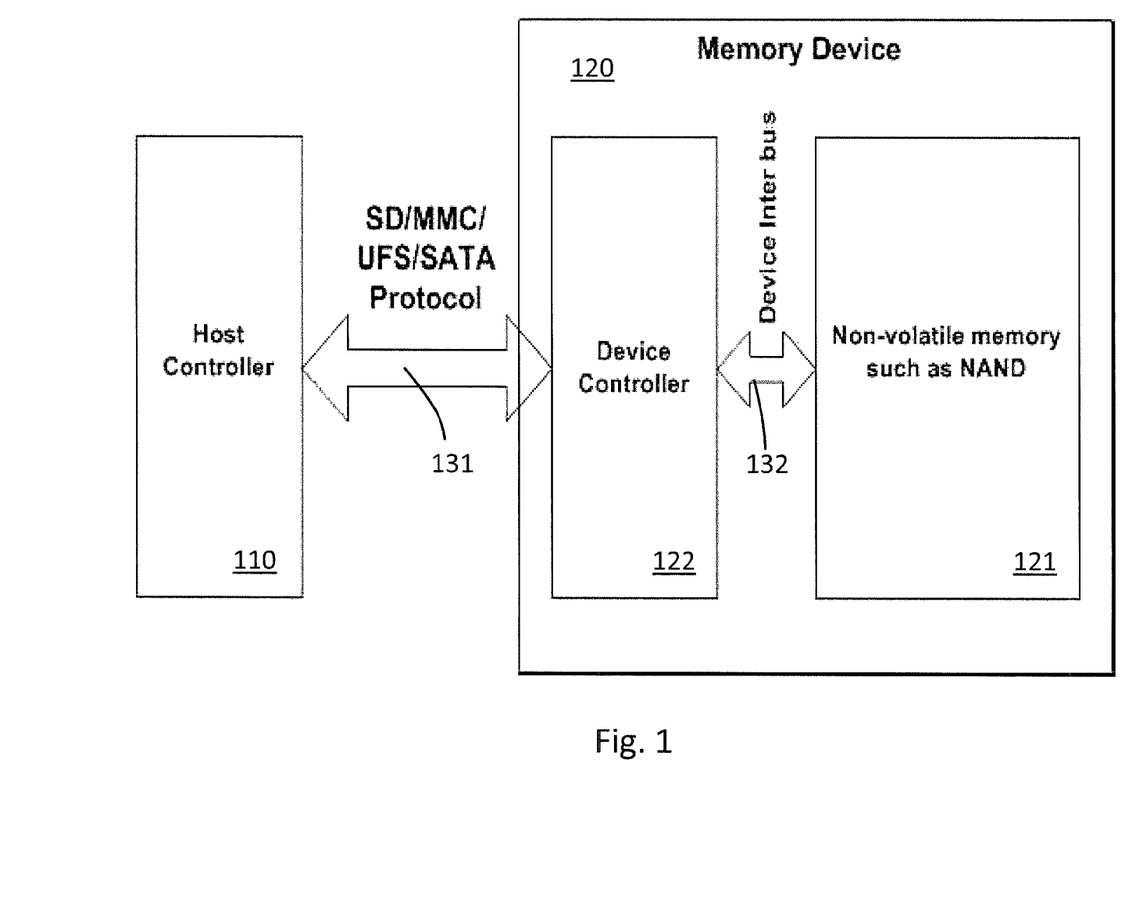
FIG. 1 illustrates a generic host-memory device interface.

Today embedded platforms such as mobile phones include support for embedded or removable memory devices connected over well known interfaces like SD (Secure Digital), MMC (Multimedia card), UFS (Unix file system) or SATA (Serial Advanced Technology Attachment) protocol as illustrated in FIG. 1. A host controller 110 is in communication 131 with a memory device 120. The memory device 120 comprises a device controller 122 and a storage medium 121 connected via a bus 132. A memory device 120 includes single or multiple instances of non volatile memory, such as NAND. Each memory instance is split into equal sized NAND blocks and each NAND block is split into NAND pages. The pages are a basic unit of read or write to NAND. Each NAND page is split into MMC blocks (typically 512B). The read or write transfer over SD, MMC or UFS happens in multiples of MMC blocks (also known as just "block" in the SD/MMC specification). The management of these memories is complex since they have limited read or write cycles at every NAND block. An embedded controller within the memory device takes care of the memory management and moves the data around so that read or write are equally distributed across NAND blocks.

To the host controller 110, the embedded controller exposes a "disk like" interface where the host can read or write an MMC block to any location without any restriction. The MMC blocks seen on the "disk like" interface are known as virtual MMC blocks and the embedded controller hides the actual location of the MMC blocks within the device. The embedded controller maintains a mapping table from the virtual MMC block to physical MMC block. On every new write to a virtual MMC block, the embedded controller writes to a free physical MMC block which is written least number of times, marks the previous physical location of the MMC block as dirty and updates the mapping table. The mapping table is part of the meta-data maintained by the embedded controller. In addition to the mapping table, the meta-data also stores a bad block table, wear table. The bad block table contains the block numbers of the bad NAND blocks. The wear table stores the read and write count of every NAND block. The embedded controller also needs to store blocks which are free, used and dirty. Some embedded controllers may derive this information indirectly from the mapping table and some embedded controllers may choose to explicitly store the free blocks, used blocks and dirty blocks in its meta-data. Some embedded controllers may store the meta-data in the spare area of the pages of NAND. Some embedded controllers store the meta-data in separate blocks.

Figure 2:
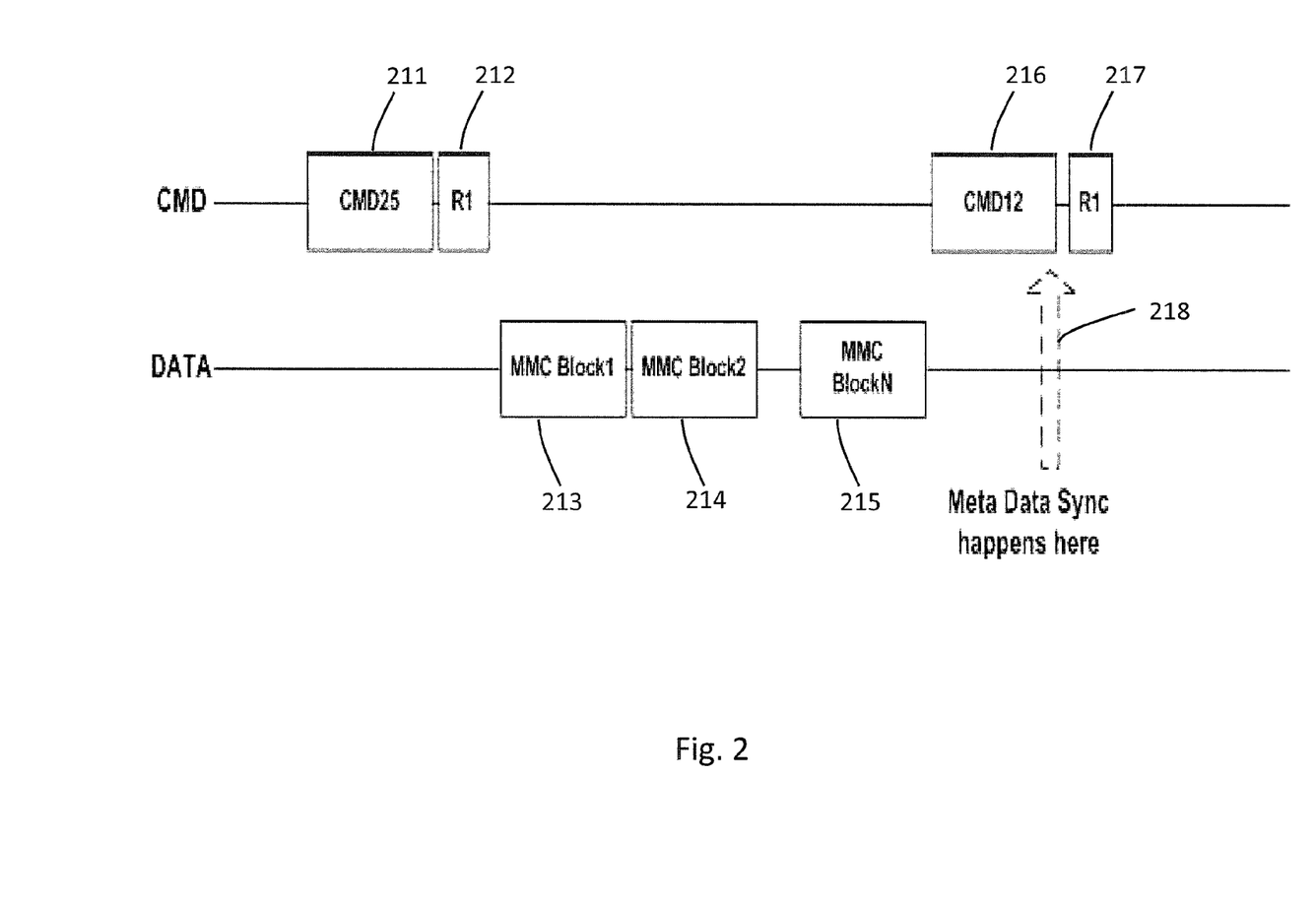
FIG. 2 illustrates a multi write transfer to eMMC.

A typical multi block write transfer on eMMC is shown in FIG. 2. At the end of each MMC block (213, 214, 215) write (CMD25), element 211 in FIG. 2, with response 212 (e.g. R1), the mapping table is updated. At the end of the programming (CMD12), element 216 in FIG. 2, with response 217 (e.g. R1), eMMC guarantees the data availability by committing the meta-data write or synchronizes the meta-data 218 to the memory 121 (e.g. in some dedicated NAND blocks). After this point, if host reads back these MMC blocks then embedded controller will fetch the updated content of these MMC blocks.

The overhead of meta-data synchronization is sometimes very significant on a high capacity NAND. On a high capacity NAND, the NAND write could be slower and meta-data could be bigger. This overhead of synchronization becomes significant when small numbers of MMC blocks are transferred in each multi block write and it impacts the write throughput. This problem impacts any embedded storage device such as MMC, SD, UFS and SATA embedding a non-volatile memory such as NAND, NOR, PRAM, PCM. This impacts severely the applications (e.g. data base applications) which continuously updates small amount of data to the embedded memory.

As per POSIX standard, file system layer on host need to guarantee file data synchronization at the non-volatile memory only when the file is closed or when there is explicit user synchronization.

One approach to solving this problem is with large cache on host side and combining small requests to make the overall request size big. But this solution cannot handle situation when the individual write requests are not in contiguous virtual MMC blocks.

The UFS and SATA specifications address cache synchronization but not controlling meta-data synchronization.

SUMMARY OF THE INVENTION

A first aspect of the invention provides a method for controlling writing of data to a data storage card having a device controller and a storage medium. The method comprises:

the device controller receiving a meta data synchronization disable command and entering a first mode in response, the first mode being characterized in that the device controller does not synchronize meta data related to a data write request for writing the data to the storage medium, leaving corresponding unsynchronized meta data;

the device controller receiving a data write request for writing the data;

the device controller effecting the data write request, whereby the data are written on the storage medium but the meta data related to the data write request is not synchronized to the storage medium.

In a second aspect, the invention provides a data storage card device controller for controlling writing of data to a data storage card having a storage medium. The device controller is configured to receive a meta data synchronization disable command and entering a first mode in response, the first mode being characterized in that the device controller does not synchronize meta data related to a data write request for writing the data to the storage medium, leaving corresponding unsynchronized meta data; and to receive a data write request for writing the data; and to effect the data write request, whereby the data are written on the storage medium but the meta data related to the data write request is not synchronized to the storage medium.

The first aspect also provides a meta data synchronization enable command and an explicit meta data synchronization command. The commands are described in detail below.

A third aspect provides software for embedding in a controller unit, the software, when embedded, enabling the controller unit to perform a method in accordance with the first aspect or one of the described embodiments thereof. The software either be in the form of source code, or it can be compiled and applied to the controller unit as firmware. It is clear to the person skilled in the art that the invention can be applied to different interfaces, including for instance SD, MMC, and UFS. As far as implementation goes, the inventive commands described above and in the following can be implemented as part of existing commands, for instance as parameters, or in new, separate commands.

BRIEF DESCRIPTION OF THE DRAWINGS

When MMC is embedded, it is often referred to as eMMC.

DETAILED DESCRIPTION OF EMBODIMENTS

The invention provides three synchronization commands to a data storage card device controller. The device controller controls writing of data to a data storage card having a storage medium. The commands can be implemented on for instance MMC, SD or UFS protocol.

The first command is a meta data synchronization disable command. This command can be sent to the device controller when a host application wants to disable synchronization of meta data related to data write requests (multi block writes). The device controller enters into a first mode, "sync. disable", where it does not do meta-data synchronization for any write request.

The second command is a meta data synchronization enable command. This command can be sent to the device controller when a host application wants the device controller to perform meta-data synchronization and enter into the a second mode, "sync. enable", where it performs meta-data synchronization at the end of any write transfer.

The third command is an explicit meta data synchronization command, "meta sync". This command can be sent to the device controller when a host application wants meta data to be synchronized. The host application can also send explicit meta data synchronization command if a file remains open for a while, whereby no meta data synchronization is performed. The host application can also automatically cause a periodic explicit meta data synchronization (e.g. based on a timer or some system or host application event). Depending on the embodiment, the device controller can remain in the "sync. disable" mode or it can go to the "sync. enable" mode.

These commands can have normal R1 response command on MMC or SD. On UFS and SATA, the commands can be implemented as UFS/SATA-specific commands and associated responses.

Figure 3:
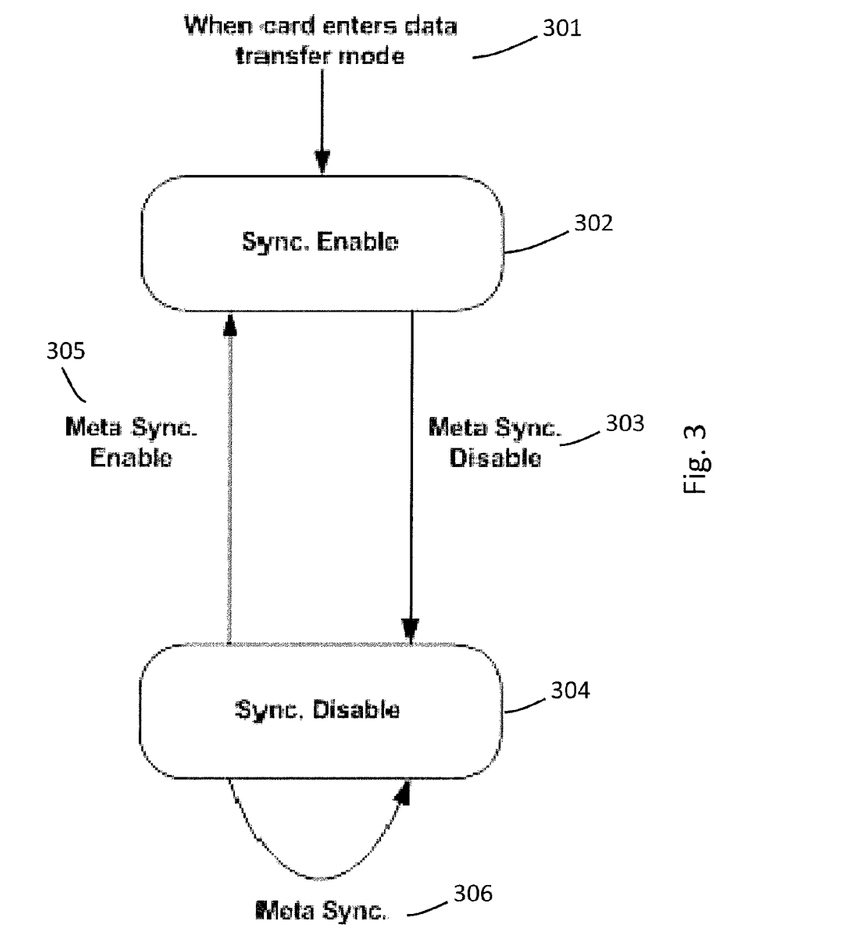
FIG. 3 illustrates an example of state machine for meta data synchronization.

The state machine for meta-data sync at embedded controller is shown in FIG. 3. In "sync.disable" state, embedded controller does not do any meta data synchronization at the end of the write transfer as shown in FIG. 4.

Figure 4:
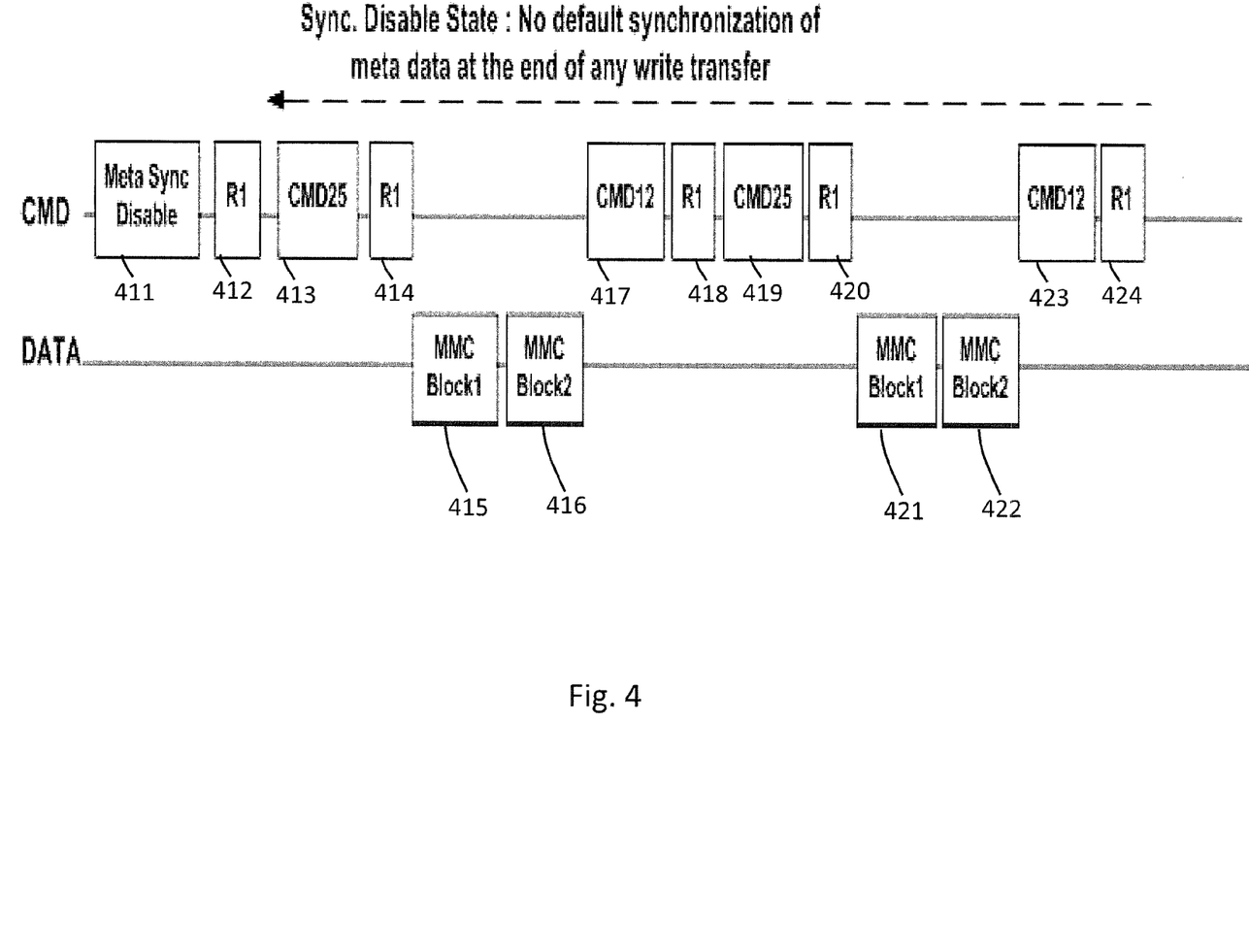
FIG. 4 illustrates multi write transfer on eMMC with meta data synchronization disable command.

FIG. 4 illustrate the storage medium programming in the sync. disable mode. The sync. disable command 411, which may for instance give a response 412, such as R1, is sent to the device controller 122. The command causes the device controller to not synchronize meta data for following writes, MMC blocks 415 and 416, even after a write command CMD25 (element 413), with response R1, 414, has been terminated by CMD12, 417, with response R1, 418. A new write command/response 419/420 of MMC blocks 421, 422, terminated by command/response 423/424, will still not cause a meta data synchronization, the device controller 122 being in the sync. disable mode.

Figure 5:
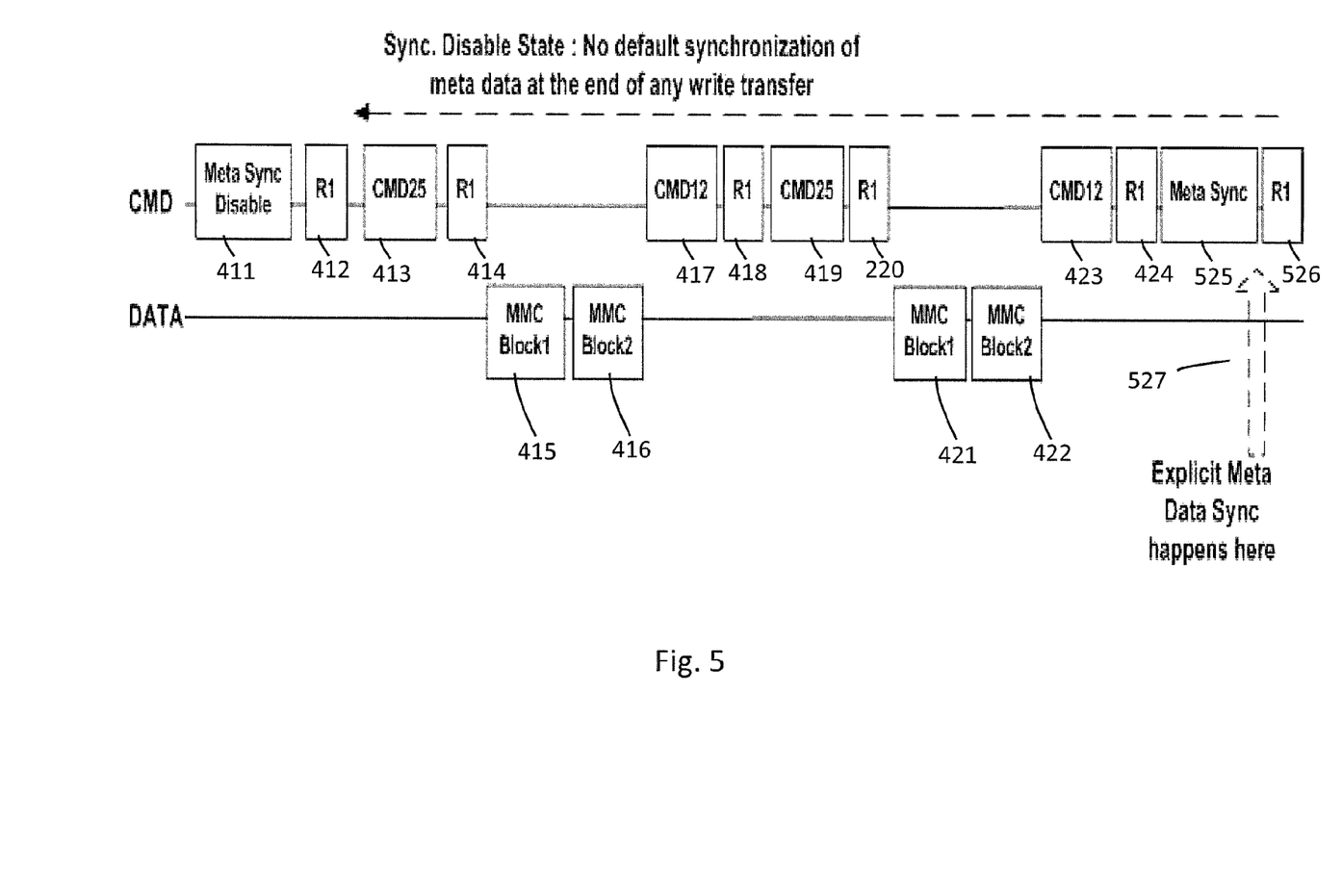
FIG. 5 illustrates multi write transfer on eMMC with explicit meta data synchronization command.

A similar picture is shown in FIG. 5. Elements 411-424 are the same as in FIG. 4, but the response 424 is followed at a later point by an explicit meta data synchronization command 525, which causes the unsynchronized meta data resulting from the writing of blocks 415, 416, 421, 422, to be synchronized 527 to the storage medium 121. The time-consuming meta data synchronization events that would otherwise have occurred as part of terminating the transfer via commands 417 and 423 in FIG. 4, has now been postponed and is effected at a later point 527. Similarly to the meta data synchronization disable command 411, the explicit meta data synchronization command 525 can have an associated response 526, such as R1.

Figure 6:
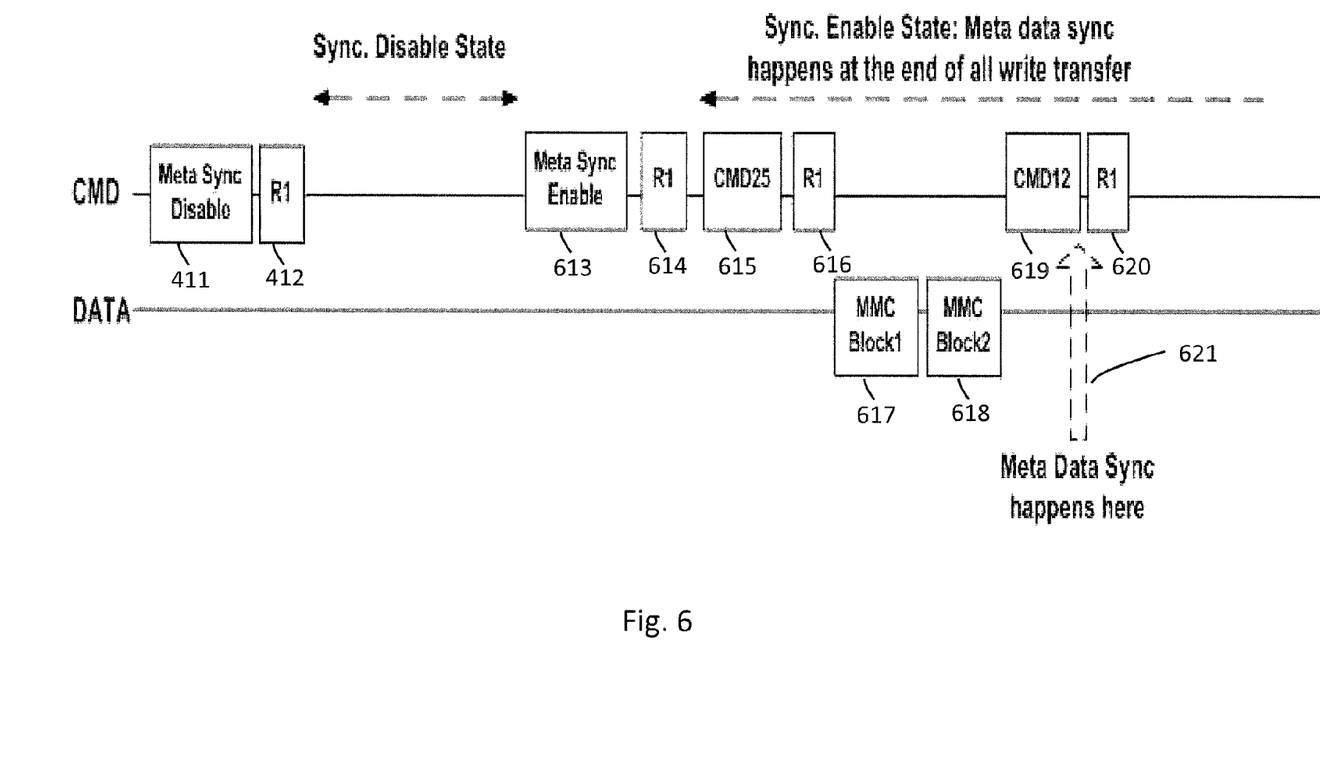
FIG. 6 illustrates multi write transfer on eMMC with meta data synchronization enable command.

FIG. 6 illustrates another command, the meta data synchronization enable command, "sync. enable". Similar to FIGS. 4 and 5, the illustrated steps begin with a sync. disable command/response 411/412. While in the sync. disable state, no MMC block write request (CMD25) meta data will be written to the storage medium, as shown by steps/blocks 413-424 in FIG. 4. At a subsequent time, the sync. enable command 613 is issued (with respone 614, e.g. R1), and further writes, such as 615 (with response R1, 616) writing blocks 617 and 618, and terminated here by CMD12 (619, with response 620), will cause a synchronization 621 of unsynchronized meta data. The meta data are from writing MMC blocks 415, 416, 421, 422, 617 and 618. The synchronization would equally well be performed immediately after issuing the sync. enable command, i.e. following 615 (or 616), but this is at the expense of an extra meta data synchronization since another one comes up sooner or later after, in FIG. 6 one related to blocks 617 and 618.

In the "sync. disable" mode, the host can do explicit synchronization with an explicit meta data synchronization command as shown in FIG. 5.

With the "sync. enable" command, the host indicates to the device controller to perform meta-data synchronization at the end of each write transfer as shown in FIG. 6.

In some embodiments, the device controller should perform meta data synchronization at least in one of the following cases, irrespective of the meta data synchronization disable mode.

When it runs out of free blocks (NAND blocks) and needs to erase some dirty blocks.

When it encounters a bad block, it needs to copy the bad block content to a good block and synchronize the meta data with the bad block table.

The invention claimed is:

1. A method for controlling the writing of data to a data storage card having a device controller and a storage medium, the method performed at the device controller and comprising:

enabling meta data synchronization at the data storage card;

receiving a meta data synchronization disable command;

entering a first mode responsive to receiving the meta data synchronization disable command, wherein in the first mode, the device controller does not synchronize meta data associated with a data write request by not writing the meta data to a predefined synchronization location in the storage medium, thereby leaving corresponding unsynchronized meta data;

receiving the data write request to write the data; and writing the data to the storage medium in response to receiving the data write request, wherein the meta data associated with the data write request is not synchronized to the storage medium.

2. The method of claim 1 wherein enabling meta data synchronization at the data storage card comprises:
receiving a meta data synchronization enable command; and
entering a second mode in response to receiving the meta data synchronization enable command, wherein in the second mode, the device controller synchronizes the unsynchronized meta data in response to the meta data synchronization enable command, or following the receipt of a subsequent data write request, by writing the meta data to the predefined synchronization location in the storage medium.

3. The method of claim 2 wherein the device controller remains in the second mode after synchronizing the unsynchronized meta data, and wherein meta data related to a subsequent data write request is synchronized to the storage medium as part of writing the data to the storage medium responsive to the subsequent data write request.

4. The method of claim 2 further comprising:
receiving the meta data synchronization enable command while the device controller is in the first mode; and
synchronizing the unsynchronized meta data to the storage medium in response to receiving the meta data synchronization enable command.

5. The method of claim 1 wherein the meta data synchronization disable command is sent to the device controller by a host controller.

6. The method of claim 2 wherein the meta data synchronization enable command is sent to the device controller by a host controller.

7. The method of claim 1 further comprising synchronizing the meta data to free up storage medium blocks while the device controller is in the first mode.

8. The method of claim 1 further comprising synchronizing meta data related to storage medium bad blocks while the device controller is in the first mode as part of storage medium bad block management.

9. The method of claim 1 further comprising:
receiving an explicit meta data synchronization command from a host controller; and
synchronizing the unsynchronized meta data in response to receiving the explicit meta data synchronization command.

10. The method of claim 9 further comprising remaining in the first mode responsive to receiving the explicit meta data synchronization command.

11. A data storage card device controller for controlling the writing of data to a data storage card having a storage medium, the device controller configured to:
enable meta data synchronization;
receive a meta data synchronization disable command;
enter a first mode in response to receiving the meta data synchronization disable command, wherein in the first mode, the device controller does not synchronize meta data related to a data write request by not writing the meta data to a predefined synchronization location in the storage medium, thereby leaving corresponding unsynchronized meta data;
receive the data write request to write the data; and
write the data to the storage medium in response to receiving the data write request, wherein the meta data associated the data write request is not synchronized to the storage medium.

12. The data storage card device controller of claim 11 wherein to enable meta data synchronization, the data storage card device controller is further configured to:
receive a meta data synchronization enable command; and
enter a second mode in response to receiving the meta data synchronization enable command, wherein in the second mode, the device controller synchronizes the unsynchronized meta data to the storage medium, either in response to the meta data synchronization enable command, or following a subsequent data write request, by writing the meta data to the predefined synchronization location in the storage medium.

13. The data storage card device controller of claim 12 wherein the device controller is further configured to:
remain in the second mode after synchronizing the unsynchronized meta data; and
synchronize meta data related to a subsequent data write request to the storage medium as part of effecting the subsequent data write request.

14. The data storage card device controller of claim 12 wherein the device controller is further configured to:
receive the meta data synchronization enable command while in the first mode; and
synchronize the unsynchronized meta data to the storage medium in response to receiving the meta data synchronization enable command.

15. The data storage card device controller of claim 11 wherein while the device controller is in the first mode, the device controller is further configured to synchronize meta data related to freeing up storage medium blocks as part of freeing up the storage medium blocks.

16. The data storage card device controller of claim 11 wherein, while the device controller is in the first mode, the device controller is further configured to synchronize the meta data related to storage medium bad blocks while managing a storage medium bad block.

17. The data storage card device controller of claim 11 further configured to receive an explicit meta data synchronization command and synchronize the unsynchronized meta data in response.

18. The data storage card device controller of claim 17 wherein the explicit meta data synchronization command causes the device controller to remain in the first mode.

19. The data storage card device controller of claim 12 wherein at least one of the meta data synchronization enable command and the meta data synchronization disable command is received from a host controller.

20. A computer program product comprising:
a non-transitory computer-readable medium configured to store instructions that, when executed by a data storage card device controller, configures the data storage card device controller to:
enable meta data synchronization at the data storage card;
receive a meta data synchronization disable command;
enter a first mode responsive to receiving the meta data synchronization disable command, wherein in the first mode, the device controller does not synchronize meta data associated with a data write request by not writing the meta data to a predefined synchronization location in the storage medium, thereby leaving corresponding unsynchronized meta data;
receive the data write request to write the data; and
write the data to the storage medium in response to receiving the data write request, wherein the meta data associated with the data write request is not synchronized to the storage medium.

\* \* \* \* \*